(12) United States Patent
Dodge et al.

(10) Patent No.: US 7,132,958 B2
(45) Date of Patent: Nov. 7, 2006

(54) DOWNHOLE TELEMETRY SYSTEM USING MULTIPLE UPLINK MODES AS DATA CHANNELS USING DISCRETE MULTI-TONE MODULATION

(75) Inventors: Carl Dodge, Houston, TX (US); Wallace R. Gardner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 456 days.

(21) Appl. No.: 10/424,475

(22) Filed: Apr. 28, 2003

(65) Prior Publication Data

US 2004/0222901 A1  Nov. 11, 2004

(51) Int. Cl.
   G01V 3/00   (2006.01)
   G01V 1/18   (2006.01)
   H04R 17/00  (2006.01)
   H04B 7/216  (2006.01)

(52) U.S. Cl. ............................... 340/854.3; 340/854.1; 340/854.2; 340/854.4; 340/854.5; 340/853.1; 340/855.5; 340/855.6; 340/855.7; 340/310.12; 367/157; 367/178; 370/441

(58) Field of Classification Search ............ 340/854.3, 340/855.7, 310.12, 853.1, 854.1, 855.5; 367/157, 367/178; 370/441
See application file for complete search history.

(56) References Cited

U.S. PATENT DOCUMENTS

| 3,603,923 | A | | 9/1971 | Nelligan ..................... 340/18 |
| 4,720,996 | A | * | 1/1988 | Marsden et al. .......... 73/152.26 |
| 5,596,604 | A | * | 1/1997 | Cioffi et al. ................ 375/260 |
| 6,469,636 | B1 | | 10/2002 | Baird et al. ............. 340/854.9 |
| 6,937,159 | B1 | * | 8/2005 | Hill et al. ................ 340/854.4 |
| 2003/0011489 | A1 | * | 1/2003 | Viswanathan ........... 340/853.1 |

* cited by examiner

*Primary Examiner*—Jeffery Hofsass
*Assistant Examiner*—Sisay Yacob
(74) *Attorney, Agent, or Firm*—Conley Rose P.C.

(57) ABSTRACT

A method and a downhole telemetry system a downhole telemetry system using discrete multitone modulation for transmitting a data stream over a plurality of transmission modes is provided. The downhole telemetry system includes a downhole transmitter, a cable, and a surface receiver. The downhole transmitter is configured to transmit the data stream over the plurality of transmission modes. The surface receiver is coupled to the downhole transmitter via the cable and is configured to combine signals from each of the plurality of transmission modes to obtain the data stream transmitted by the downhole receiver. The method includes receiving a plurality of signals over the plurality of transmission modes from a downhole package, and may further include combining the plurality of signals to form at least one data stream.

29 Claims, 8 Drawing Sheets

DOWNHOLE TELEMETRY SYSTEM USING MULTIPLE UPLINK MODES AS DATA CHANNELS USING DISCRETE MULTI-TONE MODULATION

BACKGROUND

1. Field of the Invention

The present invention relates generally to high speed digital data communications. More specifically, the invention relates to a high-speed communications scheme for transferring telemetry data between downhole sensors and a surface installation using a plurality of uplink modes as data channels and using discrete multi-tone modulation.

2. Description of Related Art

Modern petroleum drilling and production operations demand a great quantity of information relating to parameters and conditions downhole. Such information typically includes characteristics of the earth formations traversed by the wellbore, along with data relating to the size and configuration of the borehole itself The collection of information relating to conditions downhole, which commonly is referred to as "logging," can be performed by several methods.

In conventional oil well wireline logging, a probe, or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

An alternative method of logging is the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

Sensors or transducers typically are located at the lower end of the drill string in MWD systems. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface.

There are a number of telemetry systems in the prior art which seek to transmit information regarding downhole parameters up to the surface. These telemetry systems may not support an adequate data rate in the presence of noise.

SUMMARY

In one embodiment of the present invention, a downhole telemetry system using discrete multitone modulation for transmitting a data stream over a plurality of transmission modes is provided. The downhole telemetry system includes a downhole transmitter, a cable, and a surface receiver. The downhole transmitter is configured to transmit the data stream over the plurality of transmission modes. The surface receiver is coupled to the downhole transmitter via the cable and is configured to combine signals from each of the plurality of transmission modes to obtain the data stream transmitted by the downhole receiver.

In another embodiment of the present invention, another downhole telemetry system using discrete multitone modulation for transmitting a plurality of data streams over a plurality of transmission modes is provided. The downhole telemetry system includes a downhole transmitter, a cable, and a surface receiver. The downhole transmitter is configured to transmit the plurality of data stream over the plurality of transmission modes. The surface receiver is coupled to the downhole transmitter via the cable and is configured to combine signals from each of the plurality of transmission modes to obtain the plurality of data streams transmitted by the downhole receiver.

In yet another embodiment of the present invention, a method of transmitting one or more data streams over a plurality of transmission modes from a downhole package using discrete multitone modulation is provided. The method includes receiving a plurality of signals over the plurality of transmission modes from a downhole package, and combining the plurality of signals to form at least one data stream.

BRIEF DESCRIPTION OF THE DRAWINGS

For a detailed description of the preferred embodiments of the invention, reference will now be made to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

Notation and Nomenclature

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative placement of the surface and subsurface pieces of equipment.

DETAILED DESCRIPTION

Figure 1A:
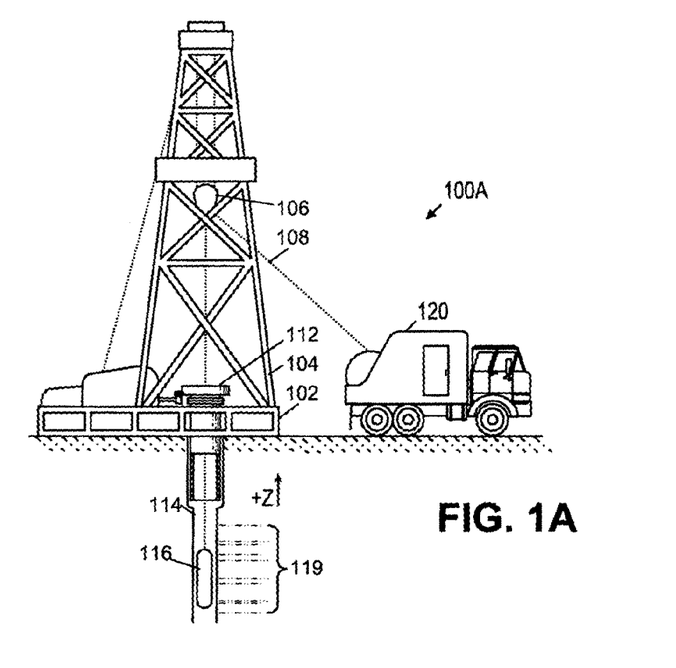
FIGS. 1A and 1B show a wireline sonde being run through a well, according to various embodiments of the present invention.

Turning now to the figures, FIG. 1A shows a well during wireline logging operations. A drilling platform 102 is equipped with an optional derrick 104 that supports a hoist 106, which may include a first sheave and a top drive. Drilling of oil and gas wells is commonly carried out by a string of drill pipes connected together by "tool" joints so as to form a drilling string that is lowered through a rotary table 112 into a wellbore, or borehole, 114. In FIG. 1A, it is assumed that the drilling string has been temporarily removed from the wellbore 114 to allow a sonde 116 to be lowered by a wireline 108 into the wellbore 114. Typically, the sonde 116 is lowered to the bottom of the region of interest and subsequently pulled upward at a constant speed. During the upward trip, the sonde 116 performs measurements on the formations 119 adjacent to the wellbore 114 as the sonde 116 passes by.

The measurement data are communicated to a logging facility 120 for storage, processing, and analysis. The logging facility 120 preferably receives telemetry from the sonde 116 via multiple modes, and may also employ cross-mode noise cancellation to enhance system performance.

Figure 1B:
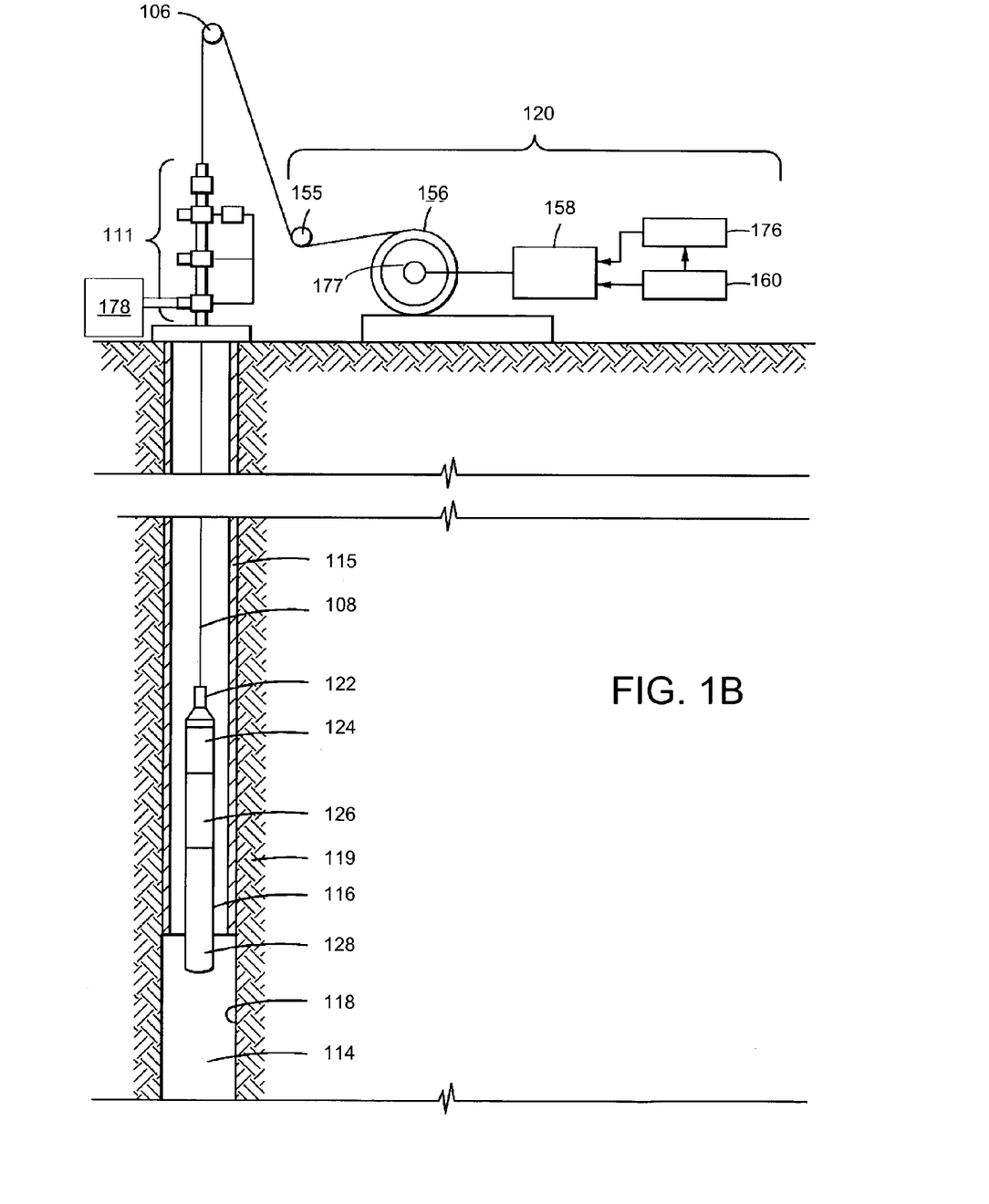

Referring to FIG. 1B, the well logging system 100B may be seen as having the sonde 116 lowered into the borehole 114 suspended on the cable 108. The borehole 114 may be cased with concentric casing 115 or be an open borehole such as at 118. The cable 108 extends from the tool 116 up through wellhead 111 and around the first sheave 106 and a second sheave 155 to a rotatable spool 156 for raising and lowering the cable 108 and the tool 116.

The conductors in cable 108 are typically connected to a transceiver 158. In an exemplary embodiment, the conductors in cable 108 are each connected to a corresponding electrically conductive slip ring (not shown) on the spool axle. The conductive slip rings transfer electrical currents from the cable that rotates with the spool to corresponding electrically conductive brushes "riding" on the slip rings. The brushes are then coupled to the transceiver 158. In this manner, signals are transferred from the rotating spool to the stationary transceiver 158 with negligible degradation.

The transceiver 158 receives the telemetry signals and in turn transmits the data and information to a computer or microprocessor 160. The computer 160 analyzes the logging data received from the downhole tool 116 and typically displays the logging information for the operator. The computer 160 may be further configured to provide control signals to transceiver 158 for communication to well logging tool 116. The cable 108 is also connected via the transceiver 158 to a power supply 176 for supplying power to the logging tool 116. In a preferred embodiment, the power supply 176 is a programmable switching power supply configurable to produce adjustable voltages and waveforms under the control of computer 160. The cable 108 may be configured to safely deliver high electrical power and bi-directional telemetry to tool 116.

The well logging tool 116 may be any one of various types used for recording downhole data. It should be appreciated that the present invention is not limited to a particular well logging tool. Typically, the well logging tool 116 includes a cable head 122 with the upper portion of the tool 116 including suitable electronic circuitry for controlling the supply of power and the transmission of the signals to and from the tool 116. Typically, the tool 116 includes a motorized unit 126 and an instrument package 128 for collecting the data on the surrounding formation 119.

In typical operation, the well logging tool 116 is passed downwardly through the cased borehole 115 and into the open borehole 118 and then retrieved from the borehole 114 by spooling the cable 108 onto the reel 156. As the well logging tool 116 passes through the borehole 114, information is gathered and collected on the characteristics on the formation 119 surrounding the borehole 114. The reel 156 is normally provided with a rotational electrical connector having stationary brushes for connecting to the transceiver 158.

In a preferred embodiment, cable 108 is a seven-conductor logging cable such as that which is obtainable from various companies including Camesa Inc. and the Rochester Corp. Suitable examples include the Rochester 7H464 $^{15}/_{32}$" diameter cable or the Rochester 7H472 "SLAMMER" cable. Typical electrical characteristics of such cables are shown below.

| Electrical Insulation resistance | 1500 megohm/kft. |
| --- | --- |
| Rated insulation breakdown voltage | 1100 VDC (1200 VDC for 7H464) |
| Conductor series resistance | ~10 ohms/kft. maximum |
| Capacitance (any conductor to armor) | 40 to 50 pf/ft. (depends on temp. rating and the insulating material) |
| Capacitive and series electrical resistance balance between outer 6 conductors | 4% maximum variation |

Figures 2A, 2B:
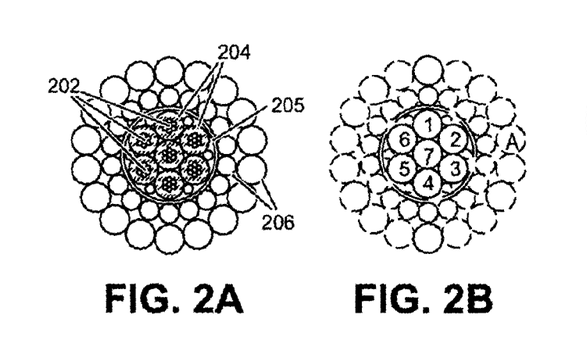
FIGS. 2A and 2B show cross-sections of seven-conductor wireline cables.

The geometry of these cables 108 is further described in FIG. 2A and FIG. 2B and typically comprises two layers of contra-helically wound steel armor encasing seven electrical conductors. The geometry of the electrical conductors is six outer conductors wrapped around a seventh central conductor. The six outer conductors are equally spaced circumferentially. The steel armor is conductive (about 1 ohm/1000 ft), and is sometimes used as an eighth electrical conductor. The steel armor is also ferromagnetic, and may be magnetically "marked" at regular intervals as a way of monitoring the downhole position of the tool 116.

Other suitable examples of cable 108 include cables with stainless steel armor, MP35 armor, or other armors that have higher armor resistances. These cables may be preferred for corrosive drilling environments (e.g. high $H_2S$ and/or $CO_2$ concentrations).

The cable 108 is typically five or more miles in length, and the electrical conductors are subject to strong capacitive and inductive coupling. As a consequence of this strong capacitive and inductive coupling, signals sent downhole along any two arbitrary conductors are subject to distortion, and they produce significant "crosstalk" on the other conductors. One solution to this problem is to use separate cables for each signal, but this is expensive and not very reliable. Another solution to this problem is to use electrical "eigenmodes" in the cable for transmitting signals. By transmitting signals over groupings of conductors having certain symmetries, much of the coupling is cancelled out by the symmetry of the conductor grouping.

It is noted that the following telemetry system discussion will be presented primarily in the context of a wireline system. However, it is recognized that this telemetry system may also be used for MWD, and the claims are not limited to wireline systems.

FIG. 2A shows a cross-section of a typical wireline cable having multiple conductors 202. Each of the conductors 202 is surrounded by an insulating jacket 204. The insulated conductors 202 are bundled together in a semi-conductive wrap 205, which is surrounded by two layers of counter-wound metal armor wire 206. Being made of metal, the armor wires 206 are conductive and may be used as an eighth conductor. For the sake of convenience, FIG. 2B shows a cross-section of the same wireline cable having its conductors numbered 1–7 and its armor labeled A. This notation will be used in describing the use of transmission modes below.

Figure 3:
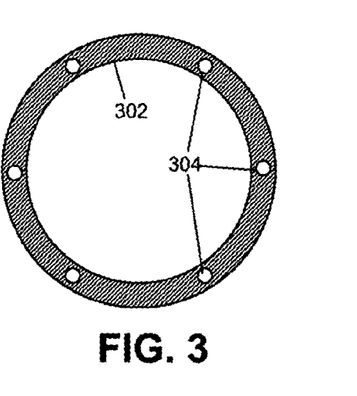
FIG. 3 shows a cross-section of composite tubing with electrical conductors embedded in the wall.

FIG. 3. shows a cross-section of yet another alternative: composite tubing 302 with embedded conductors 304. The conductors 304 are preferably equally spaced around the circumference of the tubing, and wound helically along its length. FIG. 3 provides an example of using various embodiments of the multiple mode telemetry of the present invention in the context of MWD rather than wireline logging. Note that multiple mode telemetry of the present invention is not limited to use with MWD or wireline logging, but may also be used in other implementations of down-hole communications systems.

Power and telemetry are typically conveyed together on a single cable. In single conductor cables, the power is generally transmitted as a low frequency signal, whereas the telemetry signal(s) are transmitted in a higher frequency band. In multi-conductor cables, the signal isolation is further improved by the use of orthogonal transmission modes.

Figure 4:
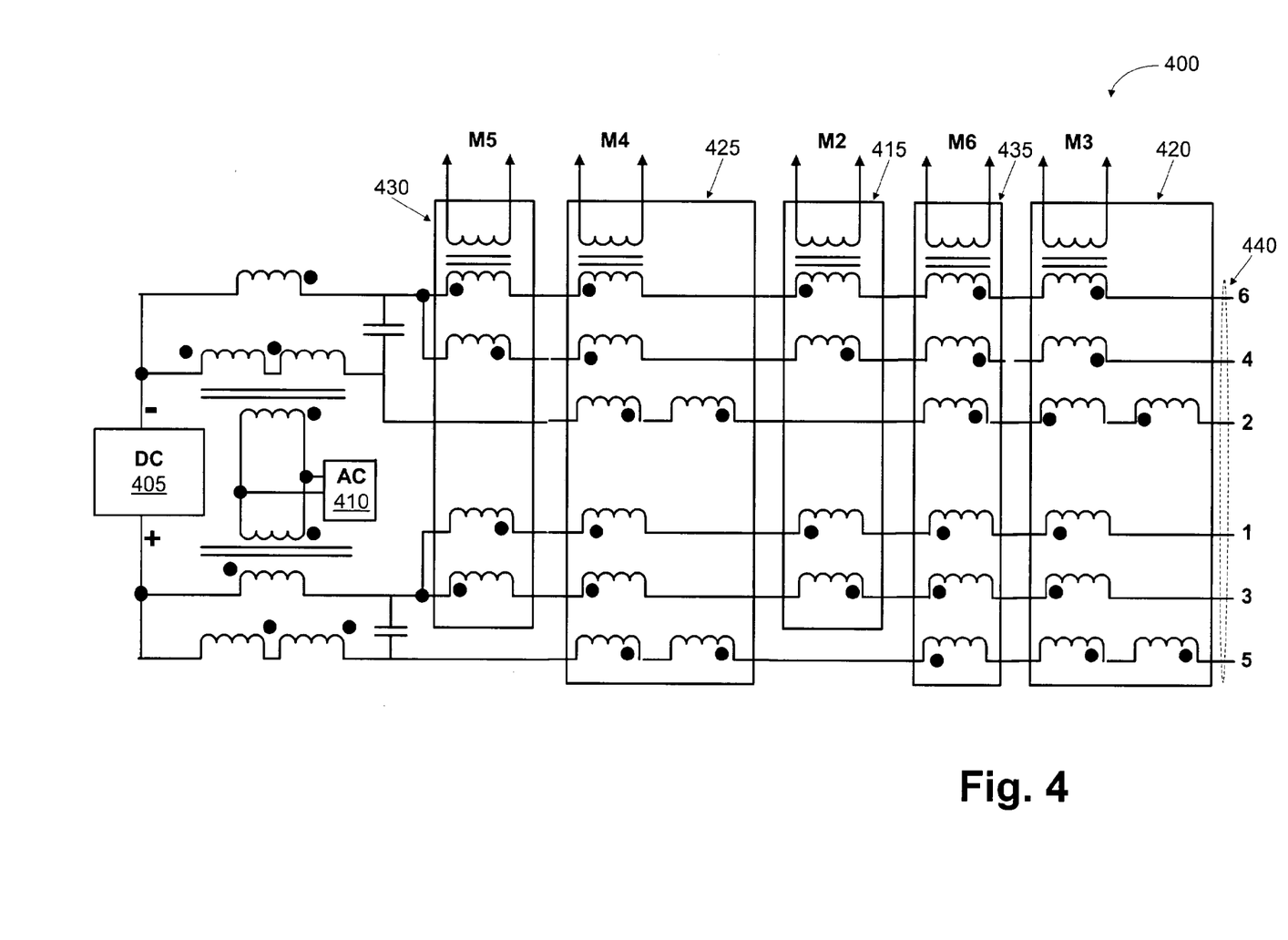
FIG. 4 shows orthogonal mode transmission and receiving circuitry, according to one embodiment of the present invention.

FIG. 4 shows one embodiment of telemetry circuitry that makes use of orthogonal transmission modes. The surface equipment includes mode transformers that induce voltages on conductors 1–6 of the multiconductor cable in response to voltages supplied to their primary windings. The combination and polarity of the voltages imposed on the conductors forms transmission modes that are each designed to be orthogonal to the other transmission modes. Signals carried via the different transmission modes can be independently received by similarly configured mode transformers the downhole equipment (not shown). Similarly, signals may be transmitted uphole using the orthogonal modes by exciting the primaries of the appropriate downhole mode transformers (not shown), and the respective surface mode transformers can extract the mode signals with minimal interference from signals carried in other modes. In short, the use of transmission modes mostly eliminates signal cross-talk which would otherwise be caused by inductive and capacitive coupling between the conductors in the multi-conductor cable.

As shown in FIG. 4, DC power is supplied at DC box 405. To provide the DC power, conductors 1, 3, and 5 are placed at one polarity while the three remaining conductors 2, 4, and 6, are placed at the opposite polarity. As this is done by direct connection in FIG. 4 as opposed to transformer coupling, the supplied voltage may be either AC or DC. The power provided at the surface may preferably be as high as 1300 volts at 3 amps.

Power may also be provided at AC box 410 for transport downhole. The AC power is excited on conductors 1–6 by driving conductors 1 and 3 with one polarity (and conductor 2 with double that polarity) while driving conductors 4 and 6 with the opposite polarity (and conductor 5 with double the opposite polarity). This excites modePower transmitted via this mode may preferably be limited to less than 480 watts, with 240 watts delivered to the load at the opposite end of the cable. Note that the AC power is imposed on mode 3 by the transformer 410, typically 60 Hz or 200 Hz. There is minimal interference with the telemetry sent or received by the transformer 420 because of frequency separation. Extra reactive power must normally be supplied because of the presence of telemetry shorting capacitors. These capacitors also act to short mode 3 power being supplied by the transformer 410 transmission on mode 3.

Power transformers may have windings with a significant series inductance. This series inductance may effectively form an open circuit to signals transmitted at typical telemetry frequencies. To counteract this effect, the circuit of FIG. 4 has capacitors to provide closed current paths at typical telemetry frequencies. Additional capacitors (not shown) may also be used to provide closed current paths at typical telemetry frequencies.

Mode transformer 415 may similarly operate to transmit and receive telemetry signals. Signals provided to terminals M2 are impressed by driving conductors 1 and 6 with one polarity while driving conductors 3 and 4 with the opposite polarity. This excites mode M2 in the cable. The voltages at terminals M2 may also reflect mode M2 signals received from the respective downhole transformer (not shown).

Mode transformer 420 may operate to transmit and receive telemetry signals. Signals provided to terminals M3 are impressed as a potential in the following proportions on conductions 1–6, respectively: +1, +2, +1, −1, −2, −1. This excites mode M3 in the cable. The voltages at terminals M3 may also reflect mode M3 signals received from the respective downhole transformer (not shown).

Mode transformer 425 may operate to transmit and receive telemetry signals. Signals provided to terminals M4 are impressed as a potential in the following proportions on conductions 1–6, respectively: +1, −2, +1, +1, −2, +1. This excites mode M4 in the cable. The voltages at terminals M4 may also reflect mode M4 signals received from the respective downhole transformer (not shown).

Mode transformer 430 may similarly operate to transmit and receive telemetry signals. Signals provided to terminals M5 are impressed by driving conductors 1 and 4 with one polarity while driving conductors 3 and 6 with the opposite polarity. This excites mode M5 in the cable. The voltages at terminals M5 may also reflect mode M5 signals received from the respective downhole transformer (not shown).

Mode transformer 435 may similarly operate to transmit and receive telemetry signals. Signals provided to terminals M6 are impressed by driving conductors 1, 3, and 5 with one polarity while driving conductors 2, 4, and 6 with the opposite polarity. This excites mode M6 in the cable. The voltages at terminals M6 may also reflect mode M6 signals received from the respective downhole transformer (not shown). Note that the mode 6 cable connection may be used to transmit DC from the power supply 405 as well as telemetry signals to or from the transformer 435. There is normally no difficulty because of the separation in frequency of the DC power and the telemetry signals on mode 6.

Eigenmode transmission in multiconductor cables is treated by David F. Strawe in the Boeing Co. report number D2-19734-1 "Analysis of Uniform Symmetric Transmission Lines" Jan. 27, 1971, and in Boeing Co. report number D2-26245-1 "Analysis of the controlled-Lay Cable" January 1973. Additional information can be found in "Multiconductor Transmission Line Analysis", by Sidnely Frankel, Artech House Inc., 1977, "Analysis of Multiconductor Transmission Lines (Wiley Series in Microwave and Optical Engineering), Clayton R. Paul, 1994, and in U.S. Pat. No. 3,603,923 dated Sep. 10, 1968 by Nulligan describing equipment using eigenmode transmission on a multiconductor cable. Orthogonal modes and the circuit of FIG. 4 are discussed in much greater detail in U.S. Pat. No. 6,469,636, entitled "High-Power Well Logging Method And Apparatus" by inventors G. Baird, C. Dodge, T. Henderson and F. Velasquez. These references are hereby incorporated by reference.

Information is typically conveyed by modulation of a carrier signal. One modulation technique which may be preferred for this application is discrete multi-tone (DMT) modulation. One example of DMT modulation is the modulation used in Asymmetrical Digital Subscriber Line (ADSL) systems. ADSL systems commonly communicate via "twisted wire pair" cables. The available bandwidth for a long twisted pair cable extends in frequency to approximately 1.1 MHz. ADSL modulation effectively divides the available bandwidth of the system into sub-channels 4.3125 kHz wide, giving 256 possible sub-channels in the 1.1 MHz bandwidth. Traditional ADSL reserves the first sub-channel (from 0–4 kHz) for audio telephone signals, and typically provides a guard band separating the sub-channels for communication from the traditional telephone service band.

In the ideal case, each frequency sub-channel, or bin, would have the same data transmission rate as all the other frequency sub-channels. However, the data rate for each sub-channel varies for a myriad of reasons. For example, interference having a particular frequency may affect certain sub-channels whose frequency is at or near the frequency of the noise source. In this instance, those sub-channels with frequencies about the same as the noise source have lower signal to noise ratios and therefore their data carrying capacity is lower than other channels. In addition to interference from outside sources, the cable conductors themselves may have an affect on the data carrying capacity of each sub-channel. Resistive and capacitive effects in the cable cause a frequency-dependent attenuation of the signals passing therethrough. The cable attenuation generally varies smoothly as a function of frequency with increasing attenuation at higher frequencies, such as shown with respect to FIG. 8. Other system components, such as transformers or suboptimal impedance matching connectors, may further aggravate attenuation at selected frequencies. To compensate for line impairments of the cable, one embodiment measures the data transmission capability of each sub-channel and assigns a data transmission rate for that sub-channel to insure that each channel is used at its maximum reliable data transmission rate given its signal to noise ratio.

For downhole communication systems, the sub-channels are preferably divided into an upstream band and a downstream band. The bandwidth between 0 and 1.1 MHz may be preferably divided into 256 equally spaced subchannels each 4.3125 kHz wide. Some of the subchannels may be reserved for dedicated purposes. For example, assuming that the subchannels are numbered in order from low frequency to high frequency, subchannel #84 may be reserved for a pilot signal. A lower subchannel #1 may be unused to provide a guard band for power signals. Some applications may call for 4 kHz power and allowance for harmonics may be desired.

It is noted that the uplink and downlink information transfer rate requirements are generally not static as is assumed in most communication systems designs. During initialization and configuration of downhole instruments, it is desirable to provide a downlink information transfer capacity that is substantially larger than the uplink information transfer capacity. The downlink is used to transfer software, commands, and parameters, and the role of the uplink is generally limited to acknowledging receipt of information packets. During normal operation, the downlink is generally limited to acknowledgements, while the uplink carries measurement data and status information. Other channel definitions and divisions are also contemplated for use with various embodiments of the present invention.

Figure 5:
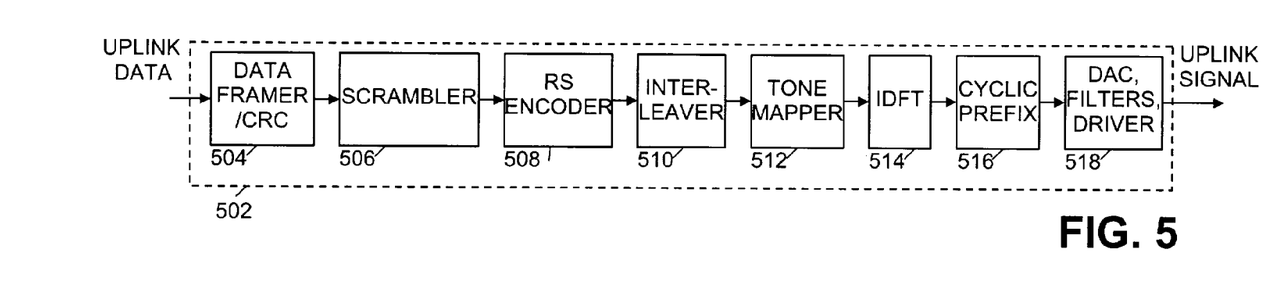
FIG. 5 shows an embodiment of a discrete multi-tone transmitter, according to one embodiment of the present invention.

FIG. 5 shows a block diagram of a DMT transmitter 502. It includes a data framer 504, a scrambler 506, an encoder 508, an interleaver 510, a tone mapper 512, an inverse discrete Fourier transform (IDFT) block 514, a cyclic prefix generator 516, and a line interface 518. The data framer 504 groups bytes of uplink data together to form data frames. The data frames are then grouped together with a synchronization frame and a cyclic redundancy checksum (CRC) which is calculated from the contents of the data frames. The CRC provides one means for detecting errors in data received at the receiving end. The scrambler 506 combines the output of the data framer 504 with a pseudo-random mask. This "randomizes" the data so as to flatten the frequency spectrum of the data signal. The scrambled data is encoded by the encoder 508 with an error correction code that adds redundancy to the data stream. The redundancy may be used to detect and correct errors caused by channel interference. A Reed-Solomon (RS) code is preferred, but other error correction codes may also be used.

The interleaver 510 is preferably a convolutional interleaver which reorders data stream symbols so as to "spread out" previously adjacent symbols. This prevents an error burst from overcoming the localized error correction ability of the error correction code. The tone mapper 512 takes bits from the data stream and assigns them to frequency bins. For each frequency bin, the bits are used to determine a discrete Fourier transform (DFT) coefficient that specifies a frequency amplitude. The number of bits assigned to each frequency bin is variable (i.e. may be different for each bin) and dynamic (i.e. may change over time), and depends on the estimated error rate for each frequency. Microcontrollers (not shown) at each end and/or the computer 160 cooperate to determine the error rate detected by the receiver in each frequency band, and to adjust the tone mapper accordingly. The coefficients provided by the tone mapper 512 are processed by the IDFT block 514 to generate a time-domain signal carrying the desired information at each frequency in the form of a DMT symbol.

The cyclic prefix block 516 duplicates the end portion of the time-domain signal and prepends it to the beginning of the time domain signal. This permits frequency domain equalization of the signal at the receiving end. The prefixed signal is then converted into analog form, filtered, and amplified for transmission across the communications channel by line interface 518.

Figures 6, 7:
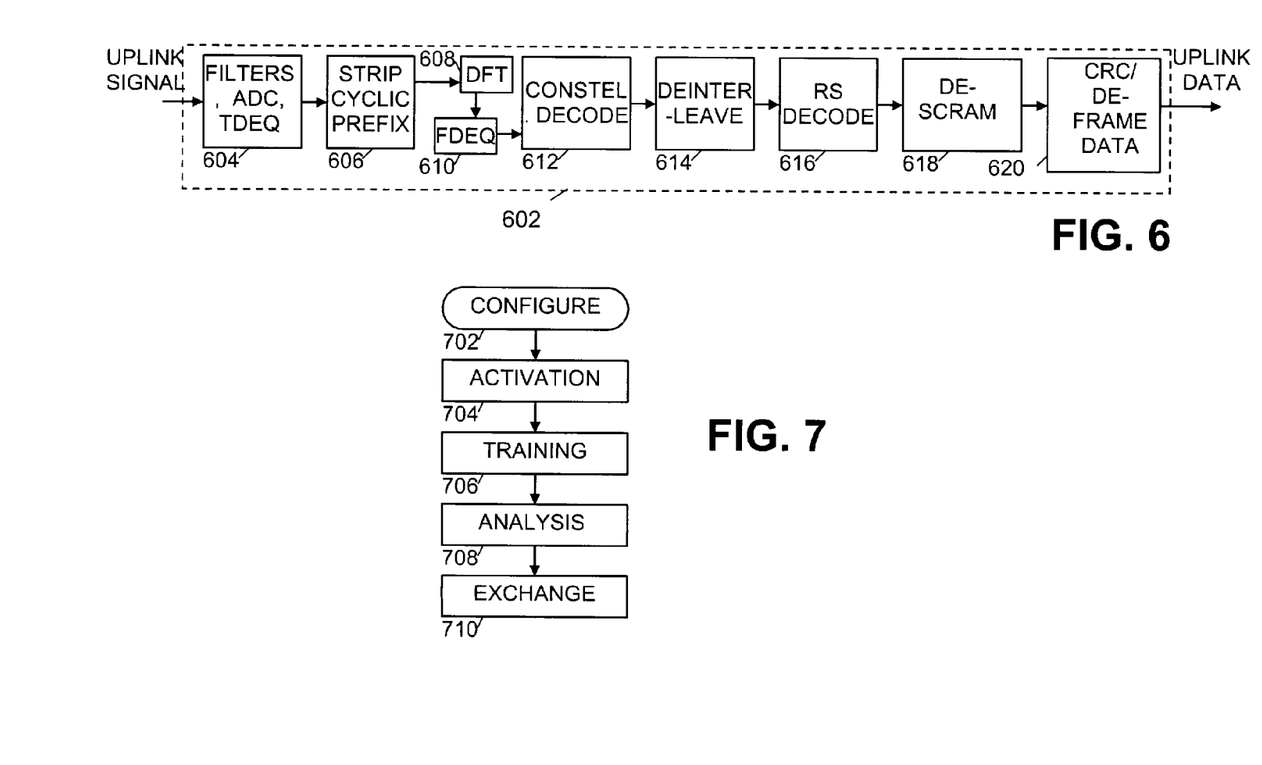
FIG. 6 shows an embodiment of a discrete multi-tone receiver, according to one embodiment of the present invention.
FIG. 7 shows an embodiment of a communications channel initialization method, according to one embodiment of the present invention.

A block diagram of a DMT receiver 602 is shown in FIG. 6. It includes a line interface 604, a cyclic prefix stripper 606, a DFT block 608, a frequency domain equalizer 610, a constellation decoder 612, a de-interleaver 614, an error correction decoder 616, a descrambler 618, and a de-framer 620. The line interface 604 filters the received signal, converts it to digital form, and performs any desired time domain equalization. The time domain equalization at least partially compensates for distortion introduced by the channel, but it is likely that at least some intersymbol interference will remain.

The cyclic prefix stripper 606 removes the cyclic prefixes that were added by the cyclic prefix block 616, but importantly, trailing intersymbol interference from the cyclic prefix remains in the signal. If desired, frequency domain equalization may be performed by block 610 to compensate for any remaining intersymbol interference. It is noted that frequency domain equalization on DFT coefficients is a cyclic convolution operation which would lead to incorrect equalization results had the cyclic prefix not been transmitted across the channel.

The constellation decoder 612 extracts the data bits from the frequency coefficients using an inverse mapping of the tone mapper 612. The de-interleaver 614 then returns the data stream to its original order. The decoder 616 decodes the data stream correcting such errors as are within its correcting ability, and descrambler 618 combines the data with the pseudo-random mask to return the data to its unscrambled form. The de-framer 620 then identifies and removes synchronization information, and determines if the CRC indicates the presence of any errors. If error free, the data is forwarded to the output. Otherwise, the microcontroller is notified of errors in the data.

Taken together, FIGS. 5 and 6 show how uplink telemetry can be conveyed across a communications channel according to various embodiments of the present invention. Downlink communications can be similarly conveyed. The components may be implemented as discrete hardware, or may be implemented as software of a digital processor within the modem, or as "firmware," a specific sequence of instructions programmed into a memory device. Other software and hardware implementations are also contemplated.

FIG. 7 shows one method of configuring the communications channel. The surface transceiver executes a configuration routine 702 that begins with an activation block 704. In this block, the uphole and downhole modems are both powered on, and a handshake phase is performed. The modems each transmit single tones to identify themselves and determine which one will control the timing of the channel. The activation block is followed by a training block 706 in which each modem takes turns transmitting wideband signals. The wideband signals allow each unit to calculate the received power spectral density, to adjust automatic gain controls, and to perform initial training of the equalizers in each receiver. The training block is followed by an analysis block 708. In the analysis block, the two modems communicate capabilities and configuration information to each other. This information preferably includes desired information transmission rates. In the exchange block 710, the modems negotiate a mutually acceptable configuration.

Figure 8:
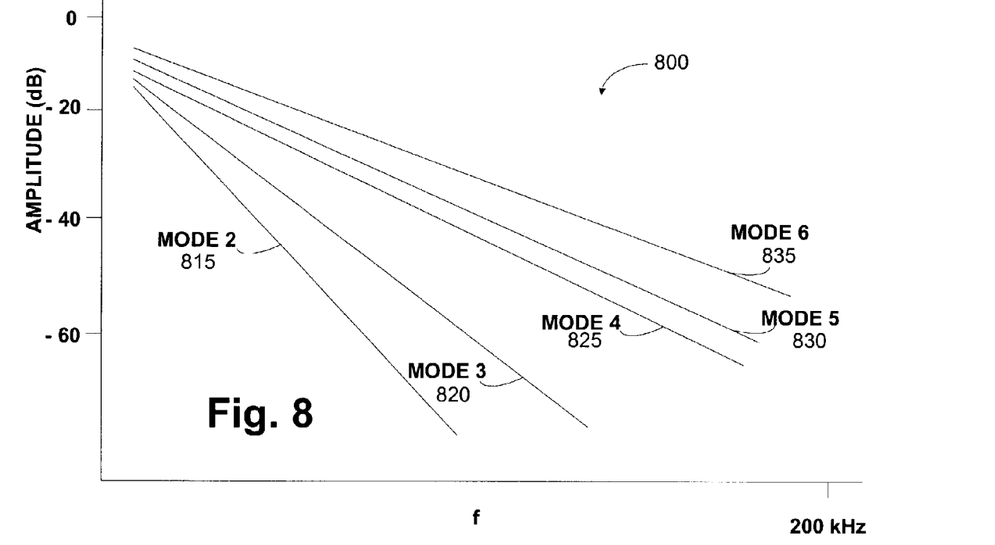
FIG. 8 shows a graph of mode amplitude as a function of frequency.
Figure 9:
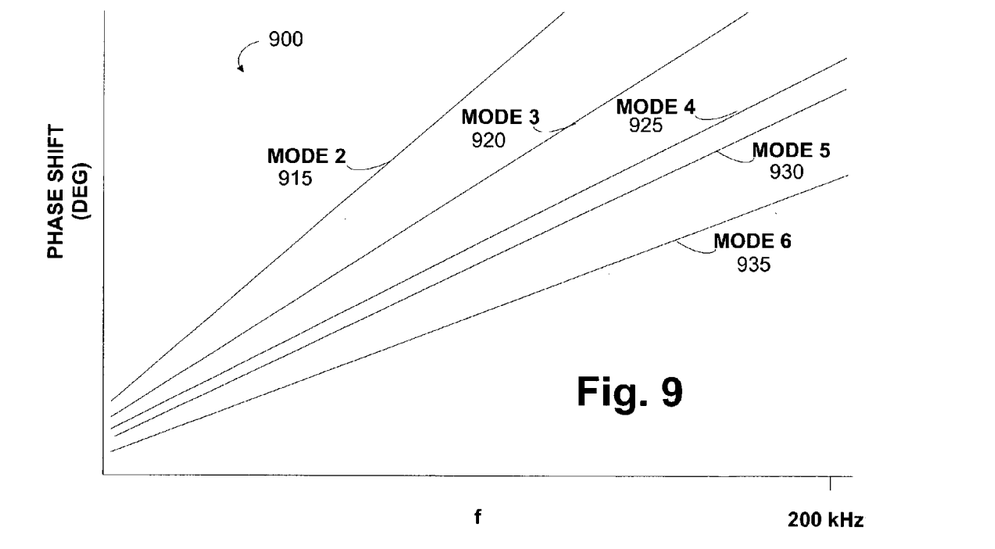
FIG. 9 shows a graph of mode phase shift as a function of frequency.

FIG. 8 and FIG. 9 each illustrate exemplary characteristics of the communications channels for modes 2–6. The graphs shown in FIG. 8 and FIG. 9 are but two of the characteristics that may be trained for using the method shown in and described herein with reference to FIG. 7. Those skilled in the art will recognize based on this disclosure that other characteristic may also be useful in training the communications channels for modes 2–6.

FIG. 8 shows a graph 800 of mode amplitude attenuation as a function of frequency. The y-axis is the amplitude with a logarithmic (dB) scale. The x-axis is frequency up to about 200 kHz. The line 815 for mode 2 shows the greatest amplitude loss, falling off by over 60 dB by about 100 kHz. The line 820 for mode 3 shows a smaller amplitude loss than line 815. The lines 825 and 830 for modes 4 and 5, respectively, track fairly closely and show a smaller amplitude loss than either lines 815 or 820. Line 835 for mode 6 shows the least amplitude loss, falling off by less than 40 dB over about 200 kHz.

FIG. 9 shows a graph 900 of mode phase shift as a function of frequency. The y-axis is the phase shift with no absolute values shown with a linear scale. The x-axis is frequency up to about 200 kHz. The line 915 for mode 2 shows the greatest phase shift as frequency increases. The line 920 for mode 3 shows a smaller phase shift than line 915. The lines 925 and 930 for modes 4 and 5, respectively, track fairly closely and show a smaller phase shift than either lines 915 or 920. Line 935 for mode 6 shows the smallest phase shift over the 200 kHz.

Figure 10:
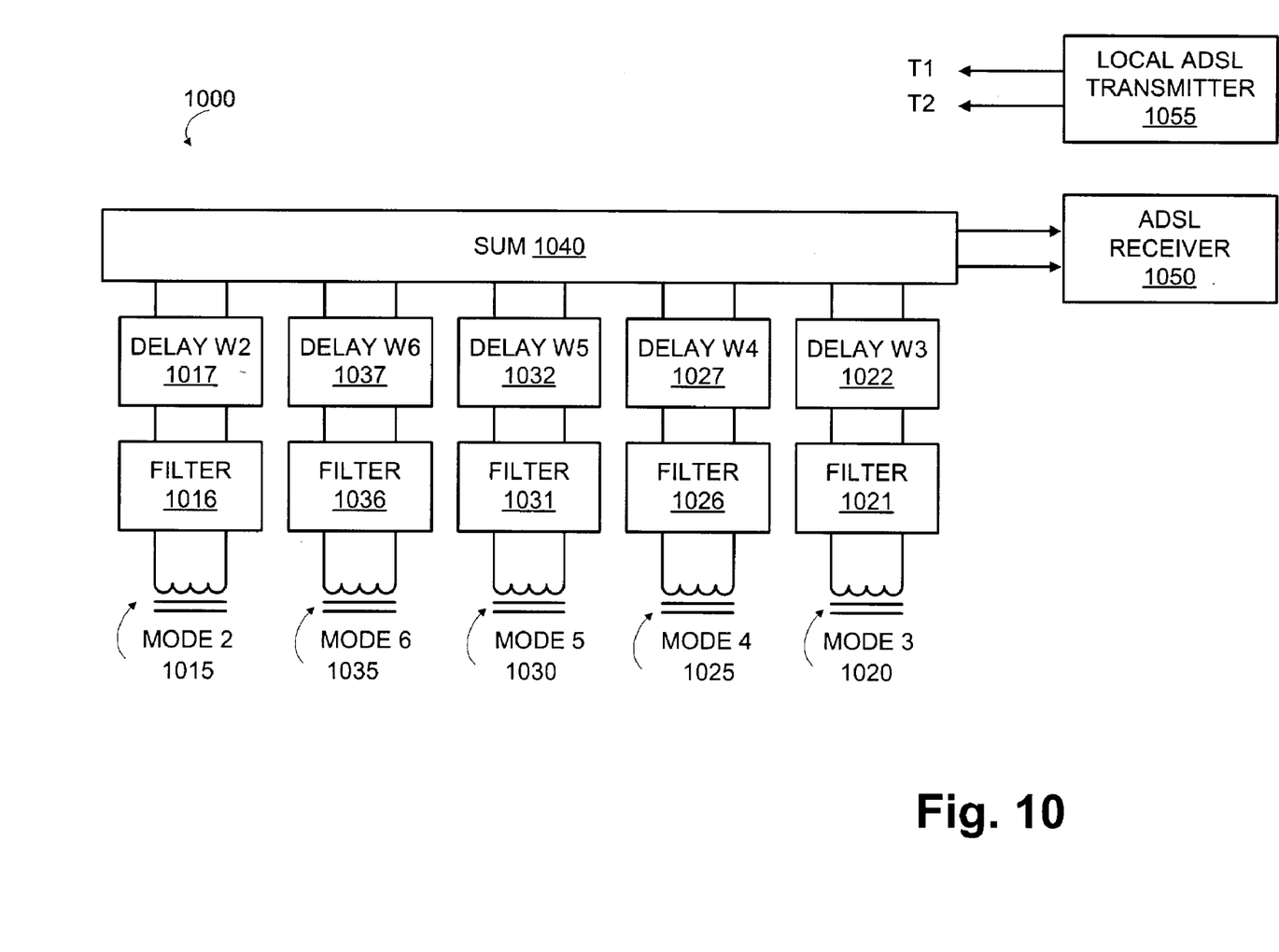
FIG. 10 shows an analog embodiment of a surface transceiver configured to use a plurality of modes to receive a data stream, according to one embodiment of the present invention.

FIG. 10 shows an analog embodiment of a local ADSL transmitter 1055 and a receiver system 1000 configured to use a plurality of modes to receive a data stream, according to one embodiment of the present invention. The receiver system 1000 includes an ADSL receiver 1050 coupled to receive a summed signal from any two or more of modes 2–6.

As shown in FIG. 10, a signal 1015 transmitted from downhole and received at the surface on mode 2 is provided to a filter 1016. The filtered signal from the filter 1016 is provided to a delay unit W2 1017. The delayed signal from the delay unit W6 107 is provided to a summer 1040. A signal 1035 on mode 6 is provided to a filter 1036. The filtered signal from the filter 1036 is provided to a delay unit W6 1037. The delayed signal from the delay unit W6 1037 is provided to the summer 1040.

A signal 1030 on mode 5 is provided to a filter 1031. The filtered signal from the filter 1031 is provided to a delay unit W5 1032. The delayed signal from the delay unit W6 1032 is provided to the summer 1040. A signal 1025 on mode 4 is provided to a filter 1026. The filtered signal from the filter 1026 is provided to a delay unit W4 1027. The delayed signal from the delay unit W4 1027 is provided to the summer 1040.

A signal 1020 on mode 3 is provided to a filter 1021. The filtered signal from the filter 1021 is provided to a delay unit W3 1022. The delayed signal from the delay unit W6 1022 is provided to the summer 1040. The output of the summer 1040 is provided to the ADSL receiver 1050.

An uplink telemetry signal may be transmitted on modes 2–6 to produce two or more of the signals 1015, 1020, 1025, 1030, 1035. Each part of the uplink telemetry signal is filtered by the respective filter before being delayed by an appropriate amount based on the phase shift in the mode used. Thus the summer 1040 sums the uplink telemetry signal from the two or more signals 1015, 1020, 1025, 1030, 1035. By using more than one mode to transmit the uplink telemetry a better signal to noise ratio and/or greater bandwidth may obtained for the uplink telemetry signal. Note that random noise on different transmission paths (modes) may tend to cancel out in summers 1141 and 1142.

In the embodiment shown, a single data stream of signals 1015, 1020, 1025, 1030, 1035 is transmitted over each of the modes 2–6. In alternative embodiments involving multiple transmitters and receivers, different (i.e., independent) data streams may be sent on different modes. One or more of the data streams may be sent on multiple modes, or each of the data streams may be sent on a single corresponding mode. Note that as many independent data streams may be sent as there are modes available. Although it may be preferred to provide for cross-mode filtering as described herein, the cross-mode filtering may be omitted in alternative embodiments. In such embodiments, separate transmitters and receivers may be provided with separate modes, and the operation of each telemetry channel may be performed independently of the others.

Figure 11:
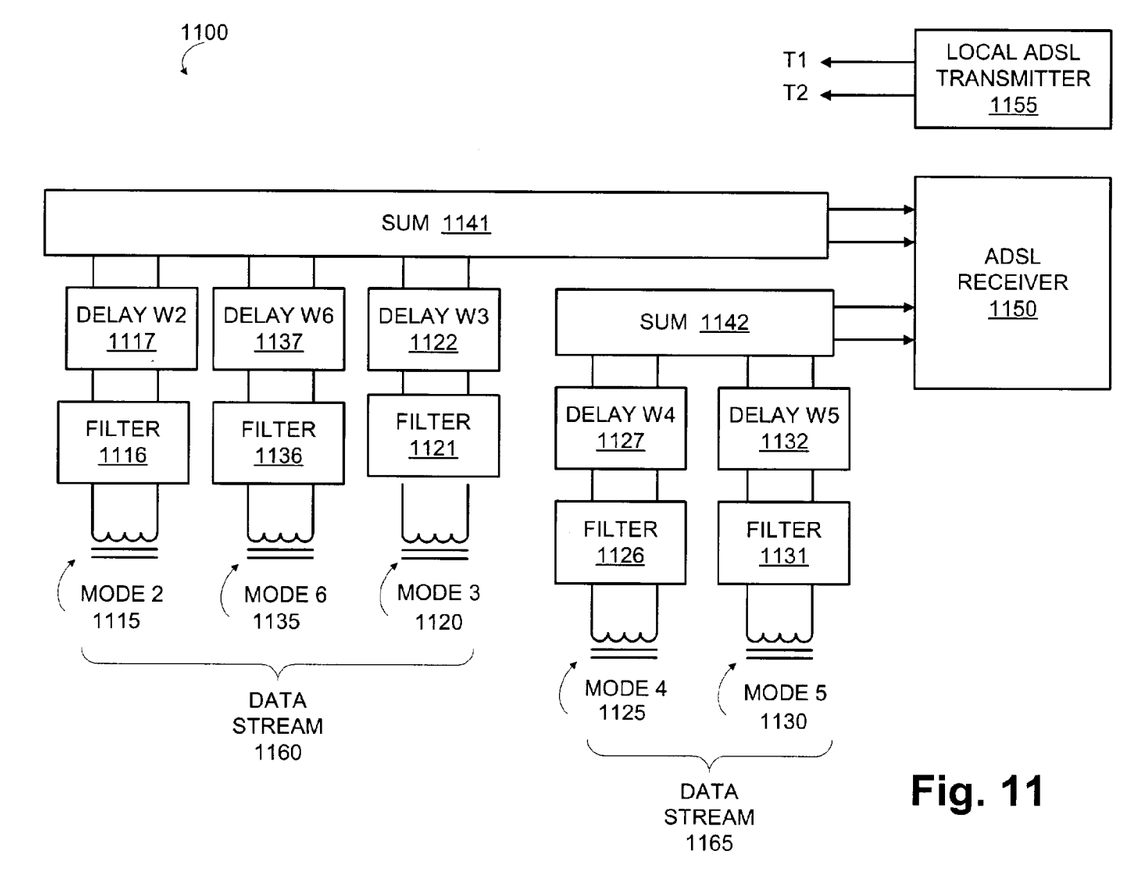
FIG. 11 shows an analog embodiment of a surface transceiver configured to use two pluralities of modes to receive a plurality of data streams, according to one embodiment of the present invention.

FIG. 11 shows an analog embodiment of a local ADSL transmitter 1155 and a receiver system 1100 configured to use two pluralities of modes to receive two independent telemetry signals 1160 and 1165, according to one embodiment of the present invention. Note that the two independent telemetry signals may be obtained by partitioning a single uplink data stream. The receiver system 1100 includes an ADSL receiver 1150 coupled to receive a summed signal of modes for telemetry signal 1160 and a summed signal of modes for telemetry signal 1165.

The telemetry signal for data stream 1160 may be sent over modes 4, 5 and 6 as mode signals 1125, 1130, and 1135, respectively. The signal 1125 is provided to a filter 1126. The filtered signal from the filter 1126 is provided to a delay unit W4 1127. The delayed signal from the delay unit W4 1127 is provided to a summer 1141. The signal 1135 is provided to a filter 1136. The filtered signal from the filter 1136 is provided to a delay unit W6 1137. The delayed signal from the delay unit W6 1137 is provided to the summer 1141. The signal 1130 is provided to a filter 1131. The filtered signal from the filter 1131 is provided to a delay unit W5 1132. The delayed signal from the delay unit W5 1132 is provided to the summer 1141. The output of the summer 1141 is provided to the ADSL receiver 1150.

The telemetry signal for data stream 1165 may be sent over modes 2 and 3 as mode signals 1115, 1120, respectively. The signal 1115 is provided to a filter 1116. The filtered signal from the filter 1116 is provided to a delay unit W2 1117. The delayed signal from the delay unit W2 1117 is provided to a summer 1142. The signal 1120 is provided to a filter 1121. The filtered signal from the filter 1121 is provided to a delay unit W3 1122. The delayed signal from the delay unit W3 1122 is provided to the summer 1142. The output of the summer 1142 is provided to the ADSL receiver 1150.

The telemetry signals for data streams 1160, 1165 are shown being conveyed by three modes and two modes, respectively. Each mode signal is filtered by the respective filter before being delayed by an appropriate amount based on the phase shift in the mode used. The summer 1141 sums the telemetry signals for data stream 1160 from the mode signals 1125, 1135, and 1130, while the summer 1142 sums the telemetry signals for data stream 1165 from the mode signals 1115, 1120.

Although two data streams 1160 and 1165 are shown being conveyed over a specific number of modes, it is understood that other numbers of data streams may be transmitted, i.e. three or more. It is also understood that other groupings of modes may be used, in any combination desired. Note that one data stream may be transmitted over a single mode while another data stream may be transmitted using a plurality of modes.

Figure 12:
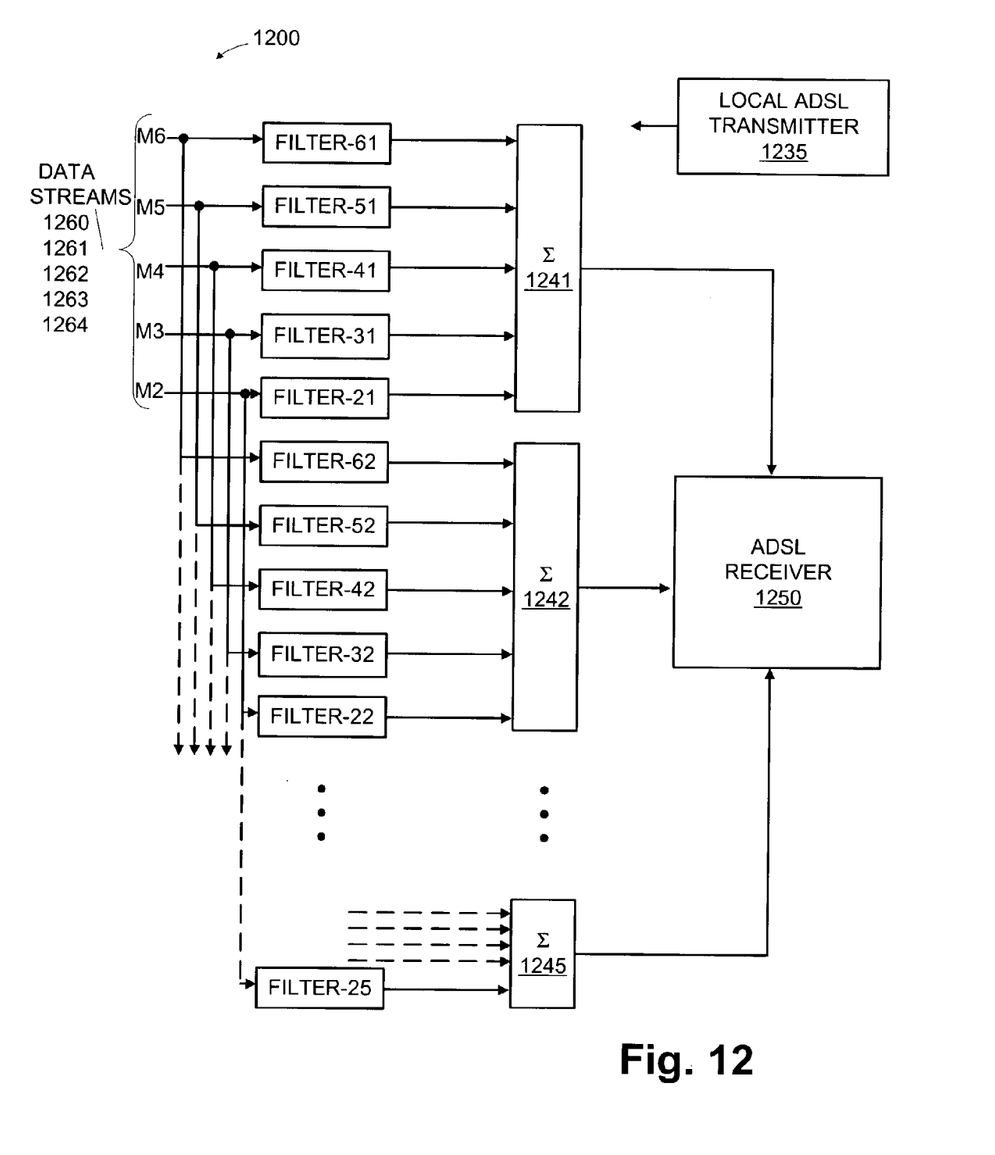
FIG. 12 shows a digital embodiment of a surface transceiver configured to use multiple modes to receive a plurality of data streams, according to one embodiment of the present invention.

FIG. 12 shows a digital embodiment of a local ADSL transmitter 1235 and a receiver system 1200 configured to use multiple modes M2, M3, M4, M5, and M6 to receive distinct telemetry signals 1260, 1261, 1262, 1263, and 1264 for a corresponding plurality of data streams, according to one embodiment of the present invention. The receiver system 1200 includes an ADSL receiver module 1250 coupled to receive telemetry signals 1260, 1261, 1262, 1263, and 1264 as obtained by cross-mode filtering of the mode signals M2–M6.

A signal from transmission mode M6 may carry a primary telemetry signal 1260 and may carry cross-mode interference from the other telemetry signals. Conversely, the other transmission mode signals may suffer from cross-mode interference from telemetry signal 1260, among others. Knowledge of the signals carried on other transmission modes may be helpful to reducing the cross-mode interference suffered by a given mode signal. Accordingly, the mode M6 signal may be filtered by filter blocks 61, 62, 63, 64, and 65, each of which may be designed to extract from the mode M6 signal information helpful to the demodulation of telemetry signals 1260, 1261, 1262, 1263, and 1264, respectively. In the same way, the signal from transmission mode M5 may carry a primary telemetry signal and may be indicative of cross-mode interference suffered in other transmission modes. The M5 signal may be filtered by filter blocks 51, 52, 53, 54, and 55 to extract from mode M5 information helpful to the demodulation of telemetry signals 1260, 1261, 1262, 1263, and 1264, respectively. In general, a signal from transmission mode MX may be filtered by filter blocks X1, X2, X3, X4, and X5.

As shown, the filtered signals from filter blocks 61, 51, 41, 31, and 21 are summed in summation block 1241 to form a cross-mode filtered telemetry signal 1260. The filtered signals from filter block 62, 52, 42, 32, and 22 are summed in summation block 1242 to form a cross-mode filtered telemetry signal 1261. In general, the filtered signals from filter block 6Y, 5Y, 4Y, 3Y, and 2Y would be summed in summation block 124Y to form a corresponding cross-mode filtered telemetry signal.

The summed signals from the summations blocks 1241–1245 would be provided to the ADSL receiver 1250. The ADSL receiver 1250 may be configured to extract one or more of the data streams 1260, 1261, 1262, 1263, 1264 from the summed signals from the summations blocks 1241–1245. By using a plurality of independent summed signals, the ADSL receiver 1250 may also be configured to filter noise and/or to remove cross-coupling interference from the data streams 1260, 1261, 1262, 1263, 1264.

Note that filtering as used and described herein may be implemented by any type of filter known to those of skill in the art. This includes adaptive filtering to remove either periodic or non-periodic noise, or both, from one or more data streams, as taught in co-pending patent application Ser. No. 10/359,930, filed on Feb. 6, 2003, entitled "Downhole Telemetry System Using Discrete Multi-Tone Modulation with Adaptive Noise Cancellation," whose inventor is Wallace R. Gardner, which is assigned to the instant assignee and is incorporated by reference in its entirety. Many suitable adaptation techniques may be found in standard textbooks, see e.g., Simon Haykin's *Adaptive Filter Theory*, Prentice Hall, Englewood Cliffs, 1986. General references for adaptive filters include (1) Simon Haykin's *Adaptive Filter Theory*, Prentice Hall, Englewood Cliffs, ©1986, and (2) B. Farhang-Boroujeny's Adaptive Filters Theory and Applications, John Wiley & Sons, ©2000, each incorporated by reference herein in their entireties. The adaptive filtering may be advantageously included in various embodiments of the present invention to remove cross-mode coupling noise.

A software implementation of the embodiments described above may comprise a series of computer instructions either fixed on a storage medium, such as a computer readable media, e.g. a diskette, a CD-ROM, a ROM, or fixed disk, or transmittable to a computer system, via a modem or other interface device, such as a communications adapter connected to the network over a transmission medium. The transmission medium can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect a given embodiment of the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

The above discussion is meant to be illustrative of the principles and various embodiments of the present invention. For example, the present invention has been discussed in the context of wireline logging. However, it may also prove advantageous in the context of MWD, particularly in when composite tubing is used. Numerous variations and modifications will become apparent to those skilled in the art once the above disclosure is fully appreciated. It is intended that the following claims be interpreted to embrace all such variations and modifications.

What is claimed is:

1. A downhole telemetry system using discrete multitone modulation for transmitting a data stream over a plurality of transmission modes, wherein the downhole telemetry system comprises:
   a downhole transmitter configured to transmit the data stream over the plurality of transmission modes so that each of the transmission modes carries duplicative data;
   a cable; and
   a surface receiver coupled to the downhole transmitter via the cable, wherein the surface receiver is configured to combine signals from each of the plurality of transmission modes to obtain the data stream transmitted by the downhole transmitter.

2. The downhole telemetry system of claim 1 wherein the plurality of transmission modes includes mode 6.

3. The downhole telemetry system of claim 1 wherein the plurality of transmission modes includes mode 4 and mode 5.

4. The downhole telemetry system of claim 1, wherein the surface receiver is further configured to filter each of the signals prior to combining the signals.

5. The downhole telemetry system of claim 1, wherein the surface receiver is further configured to delay each of the signals prior to combining the signals, wherein a length of the delay is determined by the transmission characteristics of the mode used for each of the signals.

6. The downhole telemetry system of claim 1 that further comprises:
   a surface transmitter; and
   a downhole receiver coupled to the surface transmitter via the cable.

7. The downhole telemetry system of claim 6, wherein a surface transceiver comprises the surface transmitter and the surface receiver, and wherein a downhole transceiver comprises the downhole transmitter and the downhole receiver.

8. A downhole telemetry system using discrete multitone modulation for transmitting a plurality of data streams over a plurality of transmission modes, wherein the downhole telemetry system comprises:
   a downhole transmitter configured to transmit the plurality of data streams over the plurality of transmission modes so that data stream data is duplicated in multiple transmission modes;
   a cable; and
   a surface receiver coupled to the downhole transmitter via the cable, wherein the surface receiver is configured to combine signals from the plurality of transmission modes to obtain the plurality of data streams transmitted by the downhole transmitter.

9. The downhole telemetry system of claim 8, wherein the downhole transmitter is further configured to combine two or more of the plurality of data streams prior to transmitting the plurality of data streams.

10. The downhole telemetry system of claim 9, wherein the surface receiver is further configured to extract at least one of the plurality of data streams from the signals from the plurality of transmission modes.

11. The downhole telemetry system of claim 8, wherein the plurality of data streams includes at least a first data stream and a second data stream, wherein the first data stream is transmitted over a first two or more of the plurality of transmission modes, wherein the second data stream is transmitted over a second two or more of the plurality of transmission modes.

12. The downhole telemetry system of claim 11, wherein the surface receiver is further configured to filter each of the signals prior to combining the signals.

13. The downhole telemetry system of claim 11, wherein the surface receiver is further configured to delay each of the signals prior to combining the signals, wherein a length of the delay is determined by the transmission characteristics of the mode used for each of the signals.

14. The downhole telemetry system of claim 11, wherein the first data stream is transmitted over only the first two or more of the plurality of transmission modes, wherein the second data stream is transmitted over only the second two or more of the plurality of transmission modes.

15. The downhole telemetry system of claim 8 that further comprises:
 a surface transmitter; and
 a downhole receiver coupled to the surface transmitter via the cable.

16. The downhole telemetry system of claim 15, wherein a surface transceiver comprises the surface transmitter and the surface receiver, and wherein a downhole transceiver comprises the downhole transmitter and the downhole receiver.

17. A method of transmitting one or more data streams over a plurality of transmission modes from a downhole package using discrete multitone modulation, wherein the method comprises:
 receiving a plurality of duplicative signals over the plurality of transmission modes from a downhole package; and
 combining the plurality of duplicative signals to form at least one data stream.

18. The method of claim 17, wherein the method further comprises:
 filtering each of the plurality of duplicative signals prior to combining the plurality of duplicative signals.

19. The method of claim 17, wherein the method further comprises:
 delaying each of the plurality of duplicative signals by a length determined by the transmission characteristics of the mode used for each of the plurality of duplicative signals prior to combining the plurality of signals.

20. The method of claim 17, wherein combining the plurality of duplicative signals to form at least one data stream comprises combining the plurality of duplicative signals to form a plurality of data streams.

21. The method of claim 20, wherein the method further comprises:
 combining two or more of the plurality of data streams prior to receiving the plurality of duplicative signals.

22. The method of claim 20, wherein the method further comprises:
 extracting at least one of the plurality of data streams from the plurality of duplicative signals from the plurality of transmission modes.

23. The method of claim 20, wherein the plurality of data streams includes at least a first data stream and a second data stream, and wherein receiving the plurality of duplicative signals over the plurality of transmission modes hem a downhole package further comprises:
 receiving the first data stream over a first two or more of the plurality of transmission modes; and
 receiving the second data stream over a second two or more of the plurality of transmission modes.

24. A medium encoded with a plurality of instructions readable and executable by a computing system, wherein the plurality of instructions when executed cause the computing system to perform a method of transmitting one or more data streams over a plurality of transmission modes from a downhole package using discrete multitone modulation, wherein the method comprises:
 receiving a plurality of duplicative signals over the plurality of transmission modes from a downhole package; and
 combining the plurality of signals to form at least one data stream.

25. The medium of claim 24, wherein the method further comprises:
 filtering each of the plurality of duplicative signals prior to combining the plurality of signals.

26. The medium of claim 24, wherein the method further comprises:
 delaying each of the plurality of duplicative signals by a length determined by the transmission characteristics of the mode used for each of the plurality of duplicative signals prior to combining the plurality of duplicative signals.

27. The medium of claim 24 wherein the medium is a transmission medium.

28. The medium of claim 24 wherein the medium is a storage medium.

29. A downhole telemetry system that comprises:
 one or more downhole transmitters;
 one or more surface receivers; and
 a cable coupled between the one or more downhole transmitters and the one or more surface receivers, wherein the cable is configured to carry a plurality of duplicative discrete multitone modulated datastreams over a plurality of orthogonal transmission modes.

* * * * *